United States Patent
Alp et al.

(10) Patent No.: US 7,465,508 B2
(45) Date of Patent: Dec. 16, 2008

(54) FUEL CELL STACK TEMPERATURE CONTROL SYSTEM AND METHOD

(75) Inventors: Abdullah B. Alp, Rochester, NY (US); Bruce J. Clingerman, Palmyra, NY (US); Jason R. Kolodziej, West Henrietta, NY (US); Brian D. Shaffer, Fairport, NY (US); Donald H. Keskula, Webster, NY (US)

(73) Assignee: General Motors Corporation, Detroit, MI (US)

( * ) Notice: Subject to any disclaimer, the term of this patent is extended or adjusted under 35 U.S.C. 154(b) by 920 days.

(21) Appl. No.: 10/898,144

(22) Filed: Jul. 23, 2004

(65) Prior Publication Data

US 2006/0019136 A1  Jan. 26, 2006

(51) Int. Cl.
*H01M 8/04* (2006.01)

(52) U.S. Cl. ............................. 429/24; 429/13; 429/25; 429/26

(58) Field of Classification Search ................... 429/13, 429/22, 26
See application file for complete search history.

(56) References Cited

U.S. PATENT DOCUMENTS

| 4,582,765 | A * | 4/1986 | Kothmann | 429/13 |
| 2002/0177022 | A1 * | 11/2002 | Shimonosono et al. | 429/24 |
| 2003/0175564 | A1 * | 9/2003 | Mitlitsky et al. | 429/21 |

* cited by examiner

*Primary Examiner*—Susy Tsang-Foster
*Assistant Examiner*—Adam A Arciero

(57) ABSTRACT

A temperature control system and method for a fuel cell stack cooling system is disclosed. The temperature control system includes a coolant circulation line for circulating a coolant to and from a fuel cell stack. A coolant pump is provided in the coolant circulation line, and a pump ΔP sensor is provided in fluid communication with the coolant circulation line on inlet and outlet sides of the coolant pump. The pump ΔP sensor measures a change in pump pressure between the inlet and outlet sides of the coolant pump. A pump map is provided having correlated values of pump speed, change in pump pressure and coolant flow rate for correlating the coolant flow rate with the pump speed and the change in pump pressure to attain a desired coolant flow rate for optimum fuel stack cooling.

17 Claims, 2 Drawing Sheets

FUEL CELL STACK TEMPERATURE CONTROL SYSTEM AND METHOD

FIELD OF THE INVENTION

The present invention relates to cooling systems for an electric fuel cell vehicle as well as for fuel cell stationary power, referred to as distributed generation. More particularly, the present invention relates to a fuel cell stack temperature control system and method which minimizes the number of sensors required to maintain temperature control of a fuel cell stack by using a pump delta pressure ($\Delta P$) sensor to correlate pump speed and pump $\Delta P$ with a coolant flow rate necessary to maintain optimum stack delta temperature ($\Delta T$) control.

BACKGROUND OF THE INVENTION

Fuel cell technology has been identified as a potential alternative for the traditional internal-combustion engine conventionally used to power automobiles. It has been found that power cell plants are capable of achieving efficiencies as high as 55%, as compared to maximum efficiency of about 30% for internal combustion engines. Furthermore, unlike internal combustion engines, fuel cell power plants emit no harmful by-products which would otherwise contribute to atmospheric pollution.

Fuel cell stacks include three basic components: a cathode, an anode and an electrolyte which is sandwiched between the cathode and the anode. Hydrogen at the anode is converted to positively-charged hydrogen ions. These ions travel through the electrolyte to the cathode, where they react with oxygen from the air. The remaining electrons in the anode flow to an external circuit, thereby producing electricity which drives an electric motor that powers the automobile. The electrons then travel to the cathode, where they join the oxygen and the hydrogen protons to form water, thus continuing the electricity-generating cycle. Individual fuel cells can be stacked together in series to generate electricity at higher voltages.

While they are a promising development in automotive technology, fuel cells are characterized by a specific operating temperature which presents a significant design challenge from the standpoint of maintaining the structural and operational integrity of the fuel cell stack. Maintaining the fuel cell stack within the temperature ranges that are required for optimum fuel cell operation depends on a cooling system which is suitable for the purpose.

Cooling systems for both the conventional internal combustion engine and the fuel cell system typically utilize a pump or pumps to circulate a coolant liquid through a network that is disposed in sufficient proximity to the system components to enable thermal exchange between the network and the components. To achieve reliable cooling of a fuel cell, both the outlet temperature of the fuel cell stack and the change in temperature across the fuel cell stack (stack $\Delta T$) have to be controlled. Reasonable control of both of these parameters currently requires the use of a total of six sensors: three temperature sensors, one pressure sensor, a valve position feedback sensor and a volumetric flow sensor. The use of six sensors in the fuel cell cooling system adds considerable cost to the system, especially in view of such considerations as the sensor cost; the cost of sensor wiring; the cost of connectors; the additional I/O cost in the fuel cell controller; the manufacturing cost for material handling and sensor installation; the warranty costs for replacing bad sensors; the stocking costs for maintaining spare sensors in the dealer network; the intangible cost of an additional packaging constraint; and the internal administrative costs to maintain and track additional part numbers.

In a conventional fuel cell stack cooling system, the stack outlet temperature is typically controlled primarily using a three-way radiator bypass valve that controls the quantity of heat released from the system. If the stack outlet temperature rises too high, a system controller diverts more coolant through the radiator by actuation of the radiator bypass valve to lower the temperature of the coolant. The stack outlet temperature control mechanism requires the use of two temperature sensors and a valve position feedback sensor for proper functioning.

The stack $\Delta T$, on the other hand, is primarily controlled by the speed of the coolant pump. If the stack $\Delta T$ is too high, the system controller increases the pump speed to circulate more coolant through the fuel cell stack in order to lower the stack $\Delta T$. In the conventional fuel cell stack cooling system, control of the stack $\Delta T$ requires the use of a coolant inlet temperature sensor, a coolant inlet pressure sensor and a volumetric flow meter. These elements are used to determine the pump speed which is needed to achieve the coolant flow rate required for optimum stack $\Delta T$ control.

The present invention is directed to a fuel cell stack temperature control system and method in which the coolant inlet temperature sensor, the coolant inlet pressure sensor and the volumetric flow meter can be eliminated from a fuel cell stack cooling system and replaced by a pump delta pressure ($\Delta P$) sensor. The pump $\Delta P$ sensor is used in conjunction with a pump map to determine the coolant pump speed and pump $\Delta P$ which correspond to a particular coolant flow rate. The coolant pump can then be operated at the pump speed which corresponds to the coolant flow rate that is required for optimal stack $\Delta T$ control. This substitution of three sensors with a relatively inexpensive pump $\Delta P$ sensor substantially reduces the costs associated with the additional sensors which characterize the conventional fuel cell stack cooling system.

SUMMARY OF THE INVENTION

The present invention is generally directed to a novel fuel cell stack temperature control system which includes a coolant pump and a pump delta pressure ($\Delta P$) sensor that operably engages the inlet and outlet ports of the coolant pump to measure the change in pump pressure between the inlet and outlet ports of the coolant pump. By use of a coolant pump map chart in which pump speed, change in pump pressure and coolant flow are plotted, or in conjunction with an algorithm-based coolant pump map, the pump speed and the pump $\Delta P$, indicated by the pump $\Delta P$ sensor, are correlated with a coolant flow rate. The coolant pump is then operated at the pump speed which corresponds to the coolant flow rate that facilitates the desired stack $\Delta T$.

The fuel cell stack temperature control system typically further includes a pump inlet temperature sensor which measures the pump inlet temperature that is used in conjunction with the coolant flow rate and a cathode heat exchanger model to estimate the stack coolant inlet temperature. The stack coolant inlet temperature is estimated by using the pump inlet temperature, the coolant flow rate, and the cathode heat exchanger model to determine the enthalpy of the coolant. The enthalpy of the coolant provides an accurate estimate of the stack coolant inlet temperature. The stack coolant inlet temperature is then used with the stack coolant outlet temperature, as measured by a stack coolant outlet sensor, to determine and control the stack $\Delta T$.

The present invention further includes a novel fuel cell stack temperature control method by which the rate of coolant flow in a fuel cell stack cooling system is correlated with pump speed without the use of a stack coolant inlet temperature sensor, a stack coolant inlet pressure sensor and a volumetric flow sensor. The method includes determining the rate of coolant flow required to achieve an optimum stack ΔT, measuring the pump ΔP of a coolant pump, correlating the pump speed and pump ΔP with coolant flow rate, and operating the coolant pump at the pump speed which corresponds to the rate of coolant flow which is required to achieve the optimum stack ΔT. In one embodiment, the pump ΔP, pump speed and coolant flow rate values are plotted on a pump map curve. In another embodiment, the pump map is provided in the form of a pump map algorithm.

BRIEF DESCRIPTION OF THE DRAWINGS

The invention will now be described, by way of example, by reference to the accompanying drawings, in which.

DETAILED DESCRIPTION OF THE INVENTION

Figure 1:
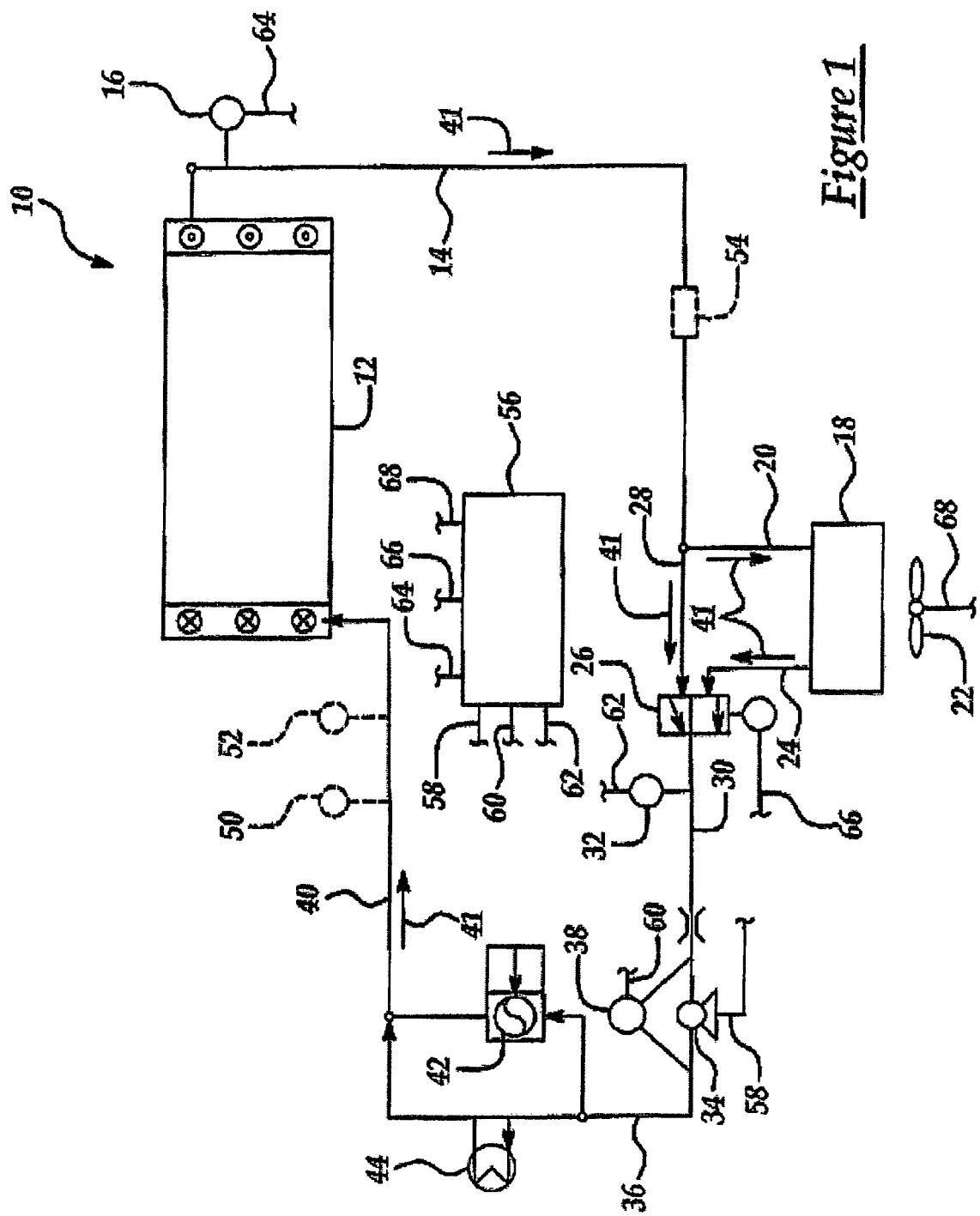
FIG. 1 is a schematic view of a fuel cell stack cooling system which incorporates an illustrative embodiment of the temperature control system according to the present invention.

Referring initially to FIG. 1, a fuel cell stack cooling system which incorporates an illustrative embodiment of the fuel cell stack temperature control system of the present invention is generally indicated by reference numeral 10. The fuel cell stack cooling system 10 includes a fuel cell stack 12 which may be conventional and is used to generate electrical power using hydrogen and oxygen for the powering of an electric fuel cell vehicle, for example. A stack coolant inlet line 40 distributes a liquid coolant 41 into the inlet port of the fuel cell stack 12. A coolant outlet line 14 extends from the outlet port of the fuel cell stack 12 to distribute the coolant 41 from the fuel cell stack 12. A coolant outlet temperature sensor 16 is provided in the coolant outlet line 14 to measure the temperature of coolant 41 flowing from the fuel cell stack 12 through the coolant outlet line 14.

A radiator inlet line 20 extends from the coolant outlet line 14 and distributes coolant 41 into a radiator 18. A radiator fan 22 moves air through the radiator to pull heat out of the coolant stream 21 in the radiator 18. A radiator outlet line 24 extends from the radiator 18 and is provided in fluid communication with a first inlet port of a three-way radiator bypass valve 26. A radiator bypass line 28 extends from the coolant outlet line 14, bypasses the radiator 18 and is provided in fluid communication with a second inlet port of the radiator bypass valve 26.

A pump inlet line 30 extends from the outlet port of the radiator valve 26. A pump inlet temperature sensor 32 is provided in thermal contact with coolant flowing through the pump inlet line 30 to measure the temperature of the coolant. A coolant pump 34 is provided in the pump inlet line 30 to pump the coolant through the system 10. A pump outlet line 36 extends from the coolant pump 34. A pump ΔP sensor 38 is provided in fluid communication with both the pump inlet line 30 and the pump outlet line 36. The anode heat exchanger 42 and the cathode heat exchanger 44 are in fluid communication with the coolant pump outlet line 36 and the stack coolant inlet line 40.

A controller 56 is operably connected to the coolant pump 34 typically through pump wiring 58. ΔP sensor wiring 60 typically connects the pump ΔP sensor 38 to the controller 56, and temperature sensor wiring 62 typically connects the pump inlet temperature sensor 32 to the controller 56. The temperature sensor wiring 64 typically connects the stack coolant outlet temperature sensor 16 to the controller 56. Accordingly, as hereinafter further described, the controller 56 is programmed to sustain a desired coolant flow rate in order to facilitate optimal stack ΔT control of the fuel cell stack 12. The controller 56 receives the change in pressure (ΔP) in the coolant between the pump inlet line 30 and the pump outlet line 36, as measured by the pump ΔP sensor 38. The controller 56 also receives the stack coolant outlet temperature from sensor 16. The controller 56 uses this ΔP and temperature information to determine a desired pump speed of the coolant pump 34 which is necessary to sustain the desired coolant flow rate.

In operation of the system 10, the coolant pump 34 pumps liquid coolant 41 from the stack coolant inlet line 40, through the fuel cell stack 12 to cool the fuel cell stack 12, and into the coolant outlet line 14. Depending on the position of the radiator bypass valve 26, some or all of the coolant 41 typically flows from the coolant outlet line 14; through the radiator inlet line 20, radiator 18 and radiator outlet line 24, respectively; through the radiator bypass valve 26; and into the pump inlet line 30. In the radiator 18, thermal exchange is conducted between flowing air and the coolant 41 to cool the coolant 41 before the coolant 41 enters the pump inlet line 30.

Some of the coolant 41 may flow from the coolant outlet line 14, through the radiator bypass line 28 and radiator bypass valve 26, respectively, and into the pump inlet line 30, thus by-passing the radiator 18. The coolant 41 bypasses the radiator 18 under circumstances in which the coolant outlet temperature, as measured by the coolant outlet temperature sensor 16, does not exceed a threshold temperature value. In the event that the coolant outlet temperature reaches or exceeds the threshold temperature value, more of the coolant 41 is diverted through the radiator 18 to cool the coolant 41 and reduce the coolant outlet temperature. The quantity of coolant 41 which is diverted through the radiator 18 is controlled by actuation of the radiator bypass valve 26, typically in conventional fashion.

The system 10 typically includes a valve position feedback sensor 48 which is operably built into the radiator bypass valve 26. The valve position sensor wiring 66 typically connects the valve position sensor 48 to the controller 56. Accordingly, the controller 56 continually receives a stack coolant outlet temperature signal 16 and uses this input signal to determine the relative quantities of coolant flowing through the radiator 18 and the radiator bypass line 28, as revealed by the position of the radiator bypass valve 26. By adjusting the position of the radiator bypass valve 26, the controller 56 is thus capable of automatically changing the quantity of coolant 41 which is diverted through the radiator 18 depending on the coolant outlet temperature of the coolant in the coolant outlet line 14.

The coolant pump 34 pumps the coolant 41 from the pump inlet line 30 and into the pump outlet line 36, anode and cathode heat exchangers 42 and 44 respectively, and stack coolant inlet line 40, respectively. From the stack coolant inlet line 40, the coolant 41 enters the inlet port of the fuel cell stack 12 to cool the fuel cell stack 12. After thermal exchange with the fuel cell stack 12, the heated coolant exits the outlet port of the fuel cell stack 12 and again enters the stack coolant outlet line 14, and the cycle is repeated.

As the coolant 41 is circulated from the pump inlet line 30, through the coolant pump 34 and into the pump outlet line 36, the pump ΔP sensor 38 measures the change in pressure (ΔP) of the coolant between the pump inlet line 30 and the pump outlet line 36. This change in pump pressure (pump ΔP) is used, in conjunction with the pump speed, to achieve a coolant flow rate which is needed to optimally control the stack ΔT of the fuel cell stack 12. Accordingly, a pump map chart or algorithm, which will be hereinafter described, is used to correlate the pump ΔP of the coolant and the pump speed with the coolant flow rate which is required to achieve optimum stack ΔT control.

Figure 2:
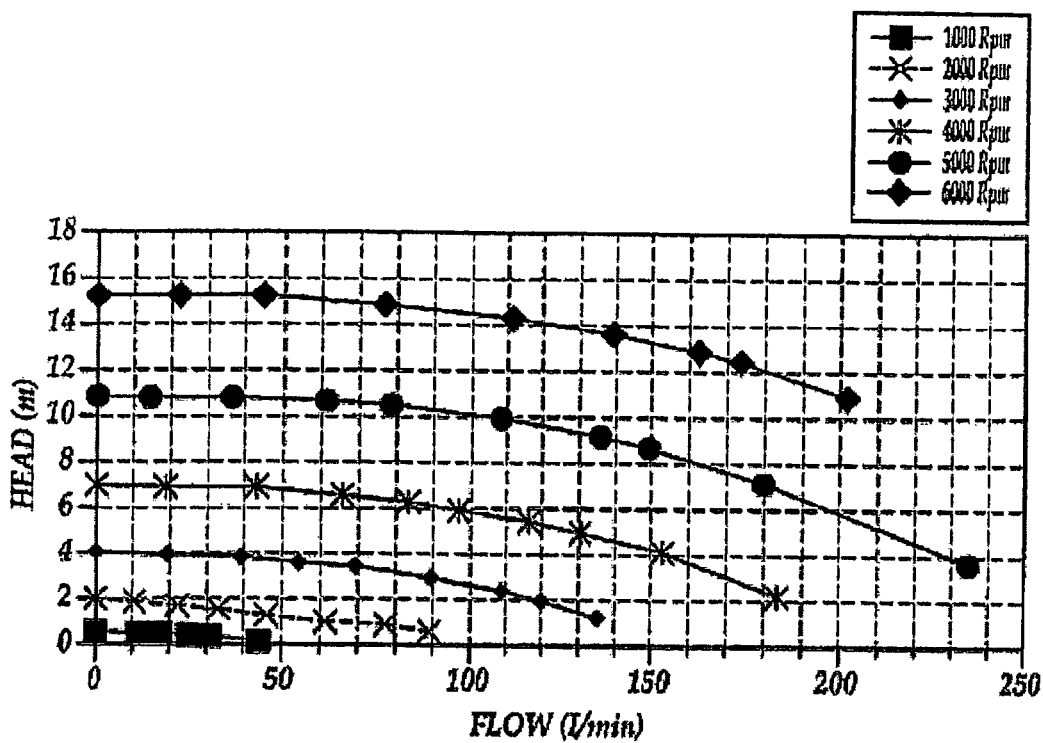
FIG. 2 is a pump map curve on which is plotted pump ΔP, pump speed and coolant flow values.

Referring to FIG. 2, a pump map chart is shown in which the pump ΔP of the coolant is plotted along the Y-axis, the rate of coolant flow in liters/min is plotted along the X-axis, and the various coolant pump speeds are indicated by the various lines on the chart. Using the pump map chart, the rate of coolant flow can be determined if the pump ΔP and pump speed are known. Because it is commanded by software, the pump speed is a known value within a very small degree of error. The pump ΔP for several representative pump speeds is measured by the pump ΔP sensor 38, as heretofore noted.

In the event that control of the stack ΔT requires a high degree of precision, the pump map chart may require a high number of data points. This method, however, can be memory-intensive. Therefore, the pump map can alternatively be represented as an equation, which will be hereinafter described. In that case, the equation coefficients can be few in number in order to conserve RAM. The equation option can take more CPU cycles, as necessary, if the equation is complex. Some PCMs (Powertrain Control Modules) have excess RAM space, while others have excess computational power, depending on the application.

The pump map chart shown in FIG. 2 can be represented in equation form by the mathematical equation:

$$\text{Head} = x_1 \text{flow}^2 + x_2 \text{flow} + x_3 \text{RPM}^2 + x_4 \text{RPM} + x_5 \text{flow} * \text{RPM},$$

where the coefficients are found from data using least squares and are as follows:

$x_1 = -0.00017388111051$
$x_2 = -0.00348872472524$
$x_3 = 0.00000041346089$
$x_4 = 0.00003617772917$
$x_5 = 0.00000294982592$

Figure 3:
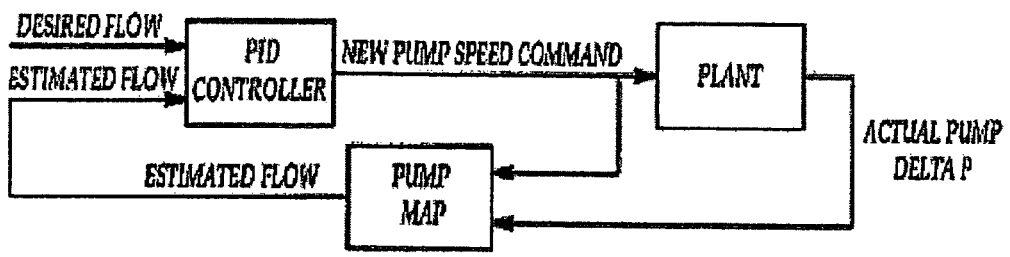
FIG. 3 is a block diagram which illustrates a closed-loop controller implementation scheme of the present invention.

Referring again to FIG. 1, in conjunction with the block diagram of FIG. 3, a closed-loop controller implementation scheme of the present invention is shown. Accordingly, the desired coolant flow rate which is needed to sustain the desired stack ΔT within the temperature requirements for the fuel cell stack 12 is initially programmed into the controller 56. The coolant pump 34, initially operating at a baseline pump speed, pumps the coolant 41 at a corresponding baseline coolant flow rate. Simultaneously, the pump ΔP sensor 38 measures the pump ΔP between the pump inlet line 30 and pump outlet line 36 and relays this information to the controller 56. The pump map chart or pump map algorithm heretofore described is then used to correlate the current pump ΔP and current pump speed with the current coolant flow rate. This coolant flow rate is interpreted by the controller 56 as an estimated coolant flow rate, which is an approximation of the baseline coolant flow rate as determined using the pump map chart or algorithm. The estimated coolant flow rate is then compared to the desired coolant flow rate to adjust the speed of the coolant pump 34, as needed to achieve the desired coolant flow rate previously programmed into the controller 56. Accordingly, the estimated coolant flow rate, determined using the pump map chart or pump map algorithm, serves as a feedback mechanism to the controller 56 and enables the controller 56 to achieve the pump speed that corresponds to the desired coolant flow rate. In this manner, the stack ΔT of the fuel cell stack 12 is maintained within the temperature requirements for the fuel cell stack 12.

Figure 4:
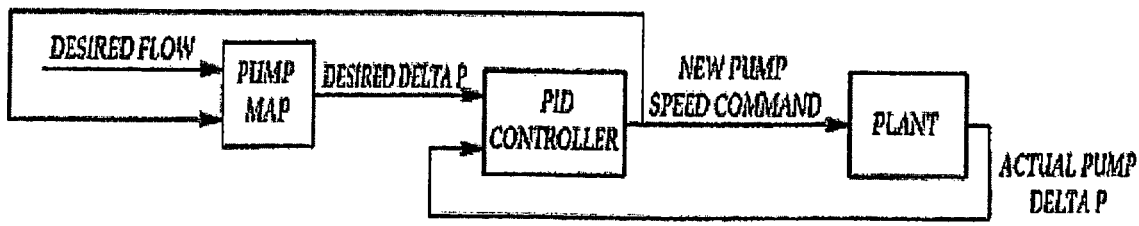
FIG. 4 is a block diagram which illustrates a closed-loop controller implementation scheme according to another embodiment of the present invention.

The block diagram of FIG. 4 illustrates an alternative closed-loop controller implementation scheme of the present invention. Accordingly, the pump map chart or algorithm is used to correlate the desired coolant flow rate with the desired pump ΔP, which is programmed into the controller 56. The pump ΔP sensor 38 continually measures the pump ΔP between the pump inlet line 30 and the pump outlet line 36 and transmits this information back to the controller 56. The controller 56 interprets the transmitted pump ΔP information as the actual pump ΔP, and adjusts the coolant pump speed accordingly to maintain the value of the actual pump ΔP as close as possible to the value of the desired pump ΔP (which corresponds to the desired coolant flow rate). In this manner, the stack ΔT of the fuel cell stack 12 is maintained within the temperature requirements for the fuel cell stack 12.

Referring again to FIG. 1, it will be appreciated by those skilled in the art that the pump ΔP sensor 38 is capable of replacing an stack coolant inlet pressure sensor 50, an stack coolant inlet temperature sensor 52 and a volumetric flow sensor 54 (shown in phantom) in the system 10 to maintain the coolant flow rate at a level that sustains an optimum stack ΔT. The stack coolant inlet temperature, formerly measured by the inlet temperature sensor 52, is needed in combination with the stack coolant outlet temperature, measured by the coolant outlet temperature sensor 16, to control the stack ΔT. The pump ΔP sensor 38 can be used to estimate the value for the stack coolant inlet temperature. This is accomplished by using a software model to estimate the stack coolant inlet temperature. According to the software model, the enthalpy of the coolant 41 is determined using the pump inlet temperature, as measured by the pump inlet temperature sensor 32, and the coolant flow as determined using the pump map chart or algorithm, as heretofore described. The model can then determine the quantity of heat added by the anode and cathode heat exchangers 42 and 44 respectively upstream of the fuel cell stack 12, then use enthalpy balance equations to achieve a close approximation of the coolant temperature as it enters the fuel cell stack 12. A transient model of the coolant system also has to be incorporated. Since the pump response time is not instantaneous, the model has to account for the pump's delay between commanded speed and actual speed. If the plumbing 36 and 40 have high thermal losses, this also must be accounted for in the transient model. The anode heat exchanger 42 typically adds a negligible quantity of heat, and so can be ignored in the determination. The quantity of heat from the air heat exchanger 44 can be determined by reading the air inlet flow and temperature (not shown) and using the heat exchanger efficiency to determine the quantity of heat added to the coolant from the air. This method provides an accurate estimation of the stack coolant inlet temperature.

In alternative forms of the invention, the pump ΔP sensor 38 can be eliminated from the system 10 if the system 10 is characterized for all positions of the radiator bypass valve 26. In that case, a pump map could be created to correlate the coolant flow rate values with the bypass valve positions and pump speed values. A restriction (equivalent to the radiator restriction) could be placed in the radiator bypass line 28. This would provide a constant system restriction regardless of the bypass valve, such that pump ΔP would be a function of coolant flow rate. If the pump ΔP sensor 38 were eliminated, another sensor which is capable of detecting flow could be added for diagnosing a pump failure.

While the preferred embodiments of the invention have been described above, it will be recognized and understood that various modifications can be made in the invention and the appended claims are intended to cover all such modifications which may fall within the spirit and scope of the invention.

What is claimed is:

1. A temperature control system for a fuel cell stack cooling system, comprising:
   a coolant circulation line for circulating a coolant to and from a fuel cell stack;
   a coolant pump provided in said coolant circulation line;
   a pump change in pressure sensor provided in fluid communication with said coolant circulation line on inlet and outlet sides of said coolant pump for measuring a change in pump pressure between said inlet and outlet sides of said coolant pump; and
   a pump map having correlated values of pump speed, change in pump pressure between said pump inlet line and said pump outlet line and coolant flow rate for correlating said coolant flow rate with said pump speed and said change in pump pressure.

2. The temperature control system of claim 1 wherein said pump map comprises a pump map chart.

3. The temperature control system of claim 1 further comprising a pump inlet temperature sensor provided in thermal communication with said coolant circulation line for measuring a pump inlet temperature of the coolant.

4. The temperature control system of claim 1 wherein said pump map comprises a pump map chart and further comprising a pump inlet temperature sensor provided in thermal communication with said coolant circulation line for measuring a pump inlet temperature of the coolant.

5. The temperature control system of claim 2 wherein said pump map chart comprises said coolant flow rate plotted along an X-axis, a change in pump inlet to outlet pressure plotted along a Y-axis of said pump map chart and pump speed plotted along a z-axis.

6. The temperature control system of claim 5 further comprising a pump inlet temperature sensor provided in thermal communication with said coolant circulation line for measuring a pump inlet temperature of the coolant.

7. A temperature control system for a fuel cell stack cooling system, comprising:
   a coolant circulation line having a coolant inlet line for distributing a coolant into a fuel cell stack, a coolant outlet line for distributing the coolant from said fuel cell stack, a pump inlet line provided in fluid communication with said coolant outlet line, and a pump outlet line provided in fluid communication with said coolant inlet line;
   a coolant pump provided in fluid communication with said pump inlet line and said pump outlet line;
   a pump change in pressure sensor provided in fluid communication with said pump inlet line and said pump outlet line for measuring a change in pump pressure between said pump inlet line and said pump outlet line; and
   a pump map having correlated values of pump speed, change in pump pressure and coolant flow rate for correlating said coolant flow rate with said pump speed and said change in pump pressure.

8. The temperature control system of claim 7 wherein said pump map comprises a pump map chart.

9. The temperature control system of claim 8 wherein said pump map chart comprises said coolant flow rate plotted along an X-axis, a change in pump pressure plotted along a Y-axis of said pump map chart and pump speed plotted along a z-axis.

10. The temperature control system of claim 7 further comprising a pump inlet temperature sensor provided in thermal communication with said pump inlet line for measuring a pump inlet temperature of the coolant.

11. The temperature control system of claim 10 wherein said pump map comprises a pump map chart and wherein said coolant flow rate is plotted along an X-axis and said change in pump pressure plotted along a Y-axis of said pump map chart and pump speed plotted along a z-axis.

12. The temperature control system of claim 7 further comprising a controller operably connected to said coolant pump and said pump change in pressure sensor for receiving input from said pump change in pressure sensor and adjusting a pump speed of said pump responsive to said input to achieve a desired coolant flow rate.

13. A method of maintaining a change in stack temperature across a fuel cell stack connected to a coolant circulation line having a coolant pump, comprising:
   determining a desired coolant flow rate for maintaining the change in stack temperature;
   measuring a change in pump pressure between inlet and outlet sides of said coolant pump;
   correlating said change in pump pressure with a pump speed of said coolant pump and a coolant flow rate; and
   adjusting said pump speed to achieve said desired coolant flow rate.

14. The method of claim 13 wherein said correlating said change in pump pressure with a pump speed of said coolant pump and a coolant flow rate comprises providing a pump map and correlating said change in pump pressure, said pump speed and said coolant flow rate on said pump map.

15. The method of claim 14 wherein said pump map comprises a pump map chart.

16. The method of claim 14 further comprising the step of adjusting pump speed to achieve a desired change in pressure.

17. The method of claim 14 further comprising the step of using the enthalpy balance and transient models to determine stack inlet temperature.

* * * * *